United States Patent [19]

Patterson et al.

[11] Patent Number: 4,880,160
[45] Date of Patent: Nov. 14, 1989

[54] TORSIONAL LINK BOOM SUSPENSION FOR REDUCING UNWANTED BOOM MOTION

[75] Inventors: Jon M. Patterson, Horicon, Wis.; Douglas P. Brown, Bettendorf, Iowa

[73] Assignee: Deere & Company, Moline, Ill.

[21] Appl. No.: 197,941

[22] Filed: May 24, 1988

[51] Int. Cl.$^4$ .............................................. B05B 1/20
[52] U.S. Cl. .................... 239/167; 172/126; 239/159
[58] Field of Search ............... 239/159, 161, 163, 167; 172/126, 130, 132; 280/455.1

[56] References Cited

U.S. PATENT DOCUMENTS

| | | | |
|---|---|---|---|
| 3,545,678 | 12/1970 | Tangeman | 239/166 |
| 3,580,505 | 5/1971 | Loeffler | 239/168 |
| 3,731,879 | 5/1973 | Dijkhof | 239/167 |
| 3,972,476 | 8/1976 | Hall | 239/167 |
| 4,106,700 | 8/1978 | Clark | 239/168 |
| 4,197,999 | 4/1980 | Lammers | 239/166 |
| 4,344,572 | 8/1982 | Tyler | 239/168 |

FOREIGN PATENT DOCUMENTS

| | | | |
|---|---|---|---|
| 1158136 | 5/1985 | U.S.S.R. | 239/167 |
| 2014834 | 9/1979 | United Kingdom . | |

*Primary Examiner*—Sherman D. Basinger
*Assistant Examiner*—Thomas J. Brahan

[57] ABSTRACT

Boom support structure for a sprayer including a boom center frame supported for rocking both about a fore-and-aft extending axis and an upright axis by a torsional pendulum structure to isolate the boom from the sprayer frame movement in both the roll and yaw directions thereby reducing fluctuations in the relative velocities of the boom ends as the sprayer moves over irregular ground surfaces. The pendulum structure and guide structure connected between the boom center frame and the boom support maintain the boom generally parallel to the ground even on hillsides without need for additional latching mechanisms.

9 Claims, 2 Drawing Sheets

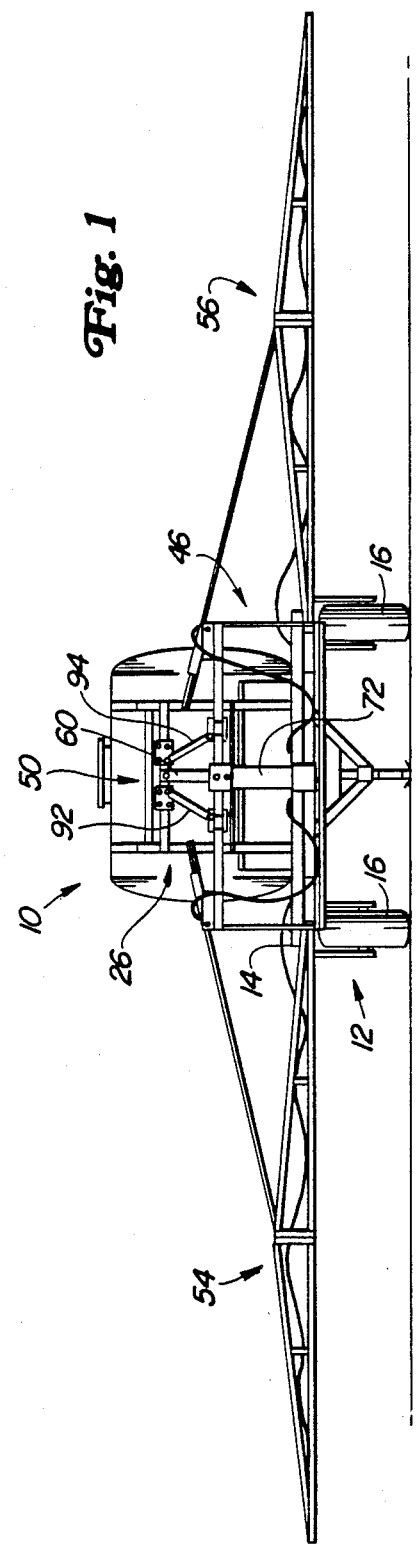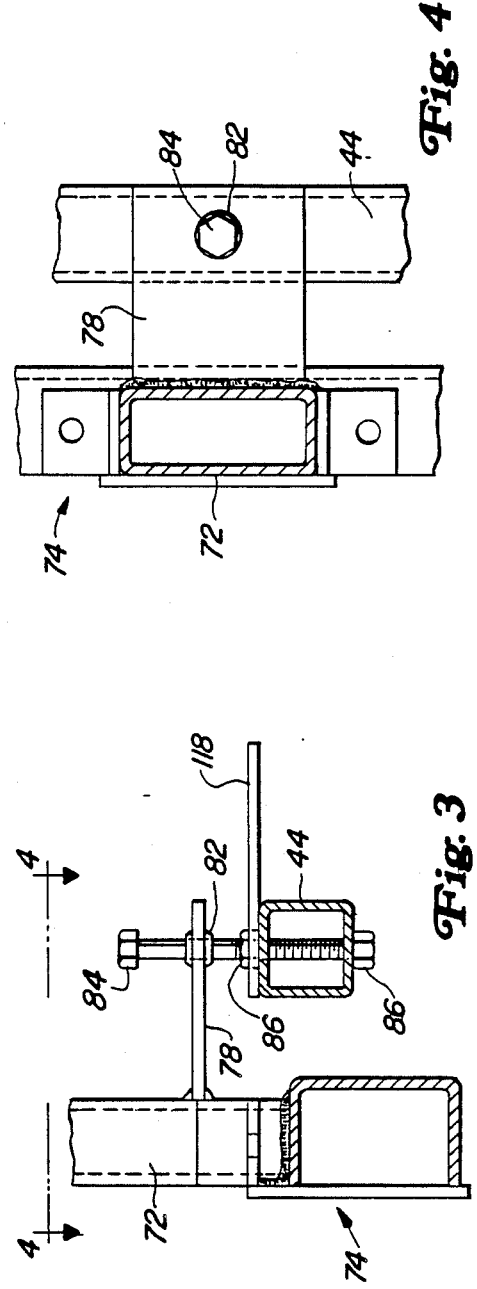

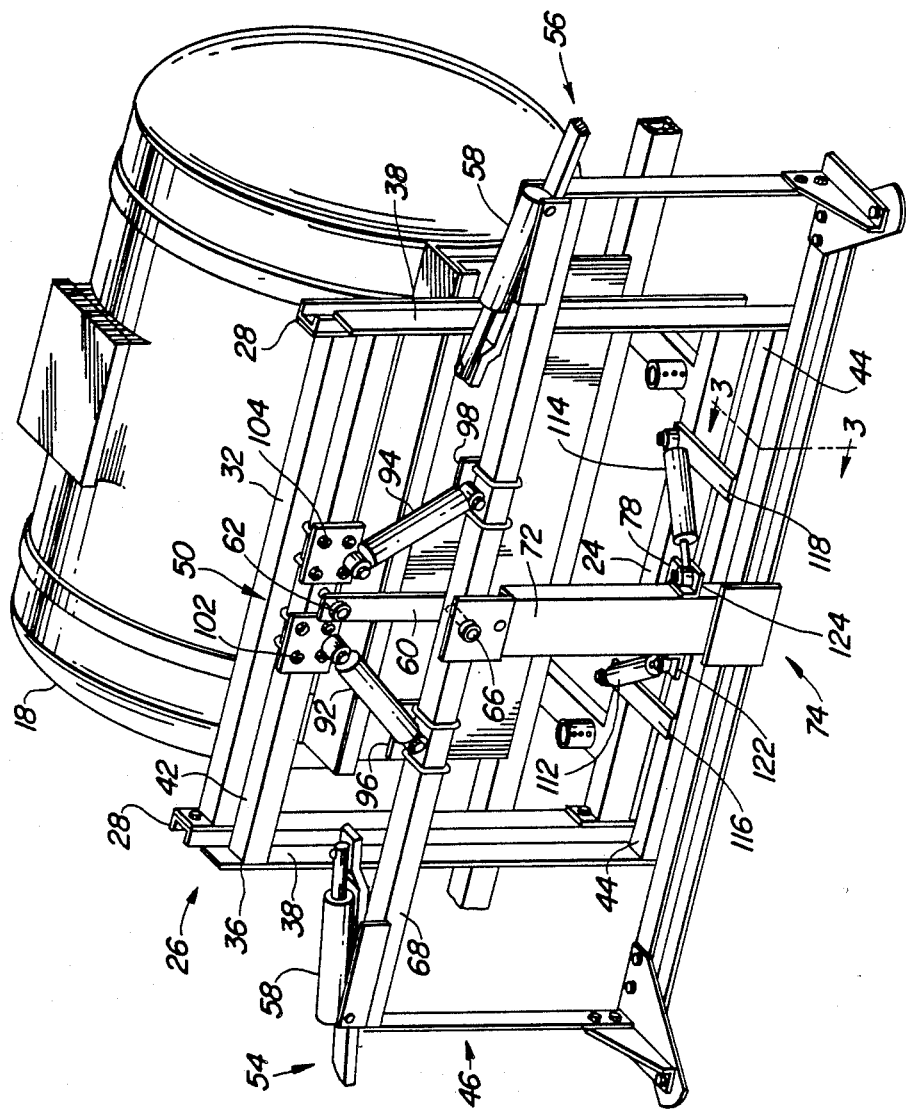

TORSIONAL LINK BOOM SUSPENSION FOR REDUCING UNWANTED BOOM MOTION

BACKGROUND OF THE INVENTION

The present invention relates generally to sprayer booms, and more specifically, to suspension systems for such booms.

As a typical agricultural sprayer passes over a field during a spraying operation, the boom is constantly moving because of motions induced by the spray vehicle as it moves over irregular and sloping ground. These motions cause the boom to yaw, pitch and roll. Such movements are greatly magnified at the ends of long booms and result in spray rate and coverage fluctuations and excessive forces on the sprayer. When the boom yaws (that is, rotates about a vertical axis), one end of the boom accelerates while the other decelerates which, in some cases, causes the spray rate to double on one end of the boom and to be cut in half on the other end of the boom. When the boom rolls (that is, rotates about an axis parallel to the direction of travel), some strips of the field will get a lower spray rate while others get a higher rate. As a result, there tends to be under application or no application of chemicals in some areas and over application in other areas. Inadequate pest and weed control, wasted chemicals and reduced yields can result from improper coverage.

Some sprayers include booms suspended from a single link or pendulum to provide roll isolation. Although such a suspension reduces the variation in chemical coverage which would otherwise result from the boom roll, the variations due to yaw are still present. In addition, presently available suspended booms usually require a latch mechanism to provide hillside compensation. The operator must physically engage the latch mechanism when operating on a hillside.

BRIEF DESCRIPTION OF THE INVENTION

It is therefore an object of the present invention to provide an improved boom suspension. It is a further object to provide such a suspension in combination with a chemical applicator for reducing the variations in chemical application caused by motions induced from the vehicle to the boom when the vehicle is moving over various ground conditions.

It is another object of the present invention to provide an improved boom suspension which provides increased isolation in the yaw direction between the boom-supporting vehicle and the boom. It is a further object to provide such a suspension which additionally reduces roll movements of the boom as the driving vehicle moves over various ground conditions. It is yet another object to provide such a suspension which automatically maintains the boom level with the ground.

With the above objects in mind, a boom suspension constructed in accordance with the teachings of the present invention includes a boom center frame suspended by a single link from the vehicle boom support. The link is designed as a torsional pendulum to offer isolation in the yaw direction, as well as roll isolation. Damping is provided for roll motions by utilizing shock absorbers connected between the boom support and the boom center frame. An upright guide member connected to the lower central portion of the boom support is received within an aperture of a sliding ball joint connected to and extending rearwardly from the boom support frame, allowing the boom to remain level with the ground without requiring a latching mechanism even when operating the sprayer on a hillside. The upper portion of the boom center frame is pivotally connected to the lower end of the torsional link for rocking with respect to the link about a fore-and-aft extending axis. As the boom frame rolls, the link will rock and lift the boom. The upright guide member and apertured bracket permit the boom center frame to move upwardly with respect to the boom support while the lower portion of the support frame remains generally centered with respect to the vehicle. Therefore, a restoring force is provided which tends to keep the boom parallel with the vehicle frame even when spraying on hillsides, while vehicle roll motions are isolated from the boom. Shock absorbers extend downwardly and outwardly from the boom support to respective connections on the upper portion of the boom center frame outwardly of the pivotal connection of the boom center frame with the torsional link to provide roll damping.

The torsional link accommodates limited rocking of the boom about an upright axis to effectively isolate the boom against yaw inputs from the vehicle, thereby minimizing unwanted fore-and-aft velocity changes at the outer ends of the booms. The torsional link biases the boom to a position generally perpendicular to the forward direction of travel by providing a restoring torque about the upright axis when the vehicle yaws. Shock absorbers connected between the lower portions of the boom support and center frame damp boom yaw movements. Since the vehicle is not rigidly coupled to the boom in the yaw and roll directions, vehicle accelerations are transmitted to the boom with substantially reduced magnitude. The relative velocity of the boom ends will not fluctuate as greatly, thus maintaining a more even spray rate. As the vehicle rolls with irregularities in the ground surface, the suspension isolates the roll from the boom and allows the boom to remain level with the ground.

These and other objects, features and advantages of the present invention will become apparent to those skilled in the art from the description which follows and from the drawings.

BRIEF DESCRIPTION OF THE DRAWINGS

FIG. 1 is a rear view of a sprayer with the boom support suspension of the present invention attached thereto.

FIG. 2 is an enlarged perspective view of the boom support suspension of FIG. 1.

FIG. 3 is a sectional view of the area of the bracket and guide taken essentially along lines 3——3 of FIG. 2.

FIG. 4 is a view taken essentially along lines 4——4 of FIG. 3.

DESCRIPTION OF THE PREFERRED EMBODIMENT

Referring to FIG. 1, there is shown a sprayer 10 including a spray cart or vehicle 12 having a frame 14 supported for forward movement over the ground by wheels 16. A chemical tank 18 is supported on the frame 14. The frame 14 includes a transversely extending rear beam 24 to which is connected an upright boom support 26. The boom support 26 includes a pair of channels 28 bolted to the outer ends of the beam 24. A connecting member 32 extends transversely between the upper ends of the channel members 28. A vertically adjustable support assembly 36 is slidably mounted on the channel members 28. The support assembly 36 includes a pair of upright angles 38 slidably received by the channel members 28 and secured thereto by bolts (not shown) in a preselected location depending upon desired boom height. Transverse beams 42 and 44 are connected between the upper and lower ends, respectively, of the upright angles 38.

A boom center frame 46 is connected to the support assembly 36 by torsional pendulum structure indicated generally at 50. Boom wings 54 and 56 are connected to the opposite ends of the boom center frame 46 for rocking about upright axes between outwardly extended positions (FIG. 1) and folded transport positions (not shown). Boom leveling cylinders 58 extend between the upper corners of the boom center frame 46 and the boom wings 54 and 56. The boom wings and folding arrangement are generally of conventional construction and so will not be described in detail here. As shown in FIG. 1, when the boom wings are extended to the field-working position, a substantial field-working width is provided so that yaw, pitch and roll transmitted from the vehicle 12 to the center frame 46 is greatly magnified at the boom ends. The torsional pendulum structure 50 is constructed to reduce or eliminate unwanted boom movement as the sprayer 10 moves over rough or irregular ground surfaces and to automatically maintain the boom wings 54 and 56 generally parallel to the ground as the sprayer is operated on inclines.

The torsional pendulum structure 50 includes an upright torsional link 60 pivotally connected at its upper end to a fore-and-aft extending pin 62 connected to the central portion of the transverse beam 42. The pin 62 permits the link 60 to rock about the axis of the fore-and-aft extending pin while preventing the upper end of the torsional link 60 from rotating about the axis of the link. A pin 66 is connected to the lower end of the link 60 and extends rearwardly therefrom through the central portion of a beam 68 which forms the top of the boom center frame 46. The pin 66 prevents rotation of the lower end of the link 60 relative to the center frame 46 about the axis of the link, while permitting pivoting of the frame 46 relative to the lower end of the link about the axis of the pin 66. A central connecting member 72 extends downwardly from the pivotal connection at 66 to a lower end which is fixed to a lower structural member 74 which extends transversely between the ends of the boom center frame 46. A bracket 78 extends rearwardly from the back face of the connecting member 72 and terminates at a location offset vertically from the lower transverse beam 44 of the boom support structure 26. A ball joint 82 is provided in the bracket 78 and slidably receives the upper shank portion of an elongated bolt 84 which is secured in an upright position to the beam 44 by a pair of nuts 86. The ball joint 82 can slide up and down the shank of the bolt 84 and the bracket 78 can roll and yaw on the ball joint 82 so that the boom center frame 46 may roll, yaw and move vertically. However, the bracket and bolt arrangement limits lateral and fore-and-aft translation of the lower end of the boom center frame 46.

To damp roll motions of the boom center frame, shock absorbers 92, 94 are connected between the center frame beam 68 and the boom support beam 42 by brackets 96, 98 and 102, 104. As best seen in FIG. 2, the shock absorbers 92, 94 diverge outwardly in the downward direction. To damp yaw movements, shock absorbers 112, 114 are connected between the lower transverse beam 44 and the lower structural member 74 of the boom center frame 46. The members 38 and 74 limit yaw motion. Bracket structures 116, 118 extend rearwardly from the top face of the beam 44 and support the cylinder ends of the shock absorbers 112, 114 above the rear beam 24. The rod ends of the shock absorbers are connected by brackets 122, 124 to the sides of the center member 72. The shock absorbers 92, 94 also limit the magnitude of the roll movements of the boom relative to the boom support 26.

The torsional link 60 yieldingly biases the boom center frame 46 and the boom wings 54 and 56 to a position transverse to the forward direction of travel of the sprayer 10. However, any relatively sudden movement of the sprayer 10 which would cause the boom wings 54, 56 and center frame 46 to yaw are isolated by the torsional link 60. Therefore, the relative velocities of the boom ends will not fluctuate as much so that a more even spray rate will be maintained. The torsional pendulum structure 50 provides a restoring torque about the vertical axis when the sprayer 10 yaws. The bracket 78 permits the lower end of the boom center frame 46 to rotate relative to the axis of the bolt 84 as the structure 50 isolates sprayer yaw from the center frame 46 and the boom wings 54 and 56.

The weight of the entire boom assembly at the lower end of the pendulum along with the sliding action of the bracket 78 along the bolt 84 tend to maintain the sprayer boom parallel with the spray cart frame 14. However, as the sprayer 10 encounters ground surface irregularities which cause spray vehicle roll, the pendulum structure 50 isolates these roll motions from the boom and allows the boom to remain level with the ground. Damping is provided for roll motions by the shock absorbers 92 and 94. As the sprayer 10 encounters irregularities which tend to roll the sprayer frame 14 about a fore-and-aft extending axis, the torsional link 60 rocks about the fore-and-aft axis of the upper mounting pin 62, and the boom center frame 46 rocks with respect to the lower end of the link 60 about the pin 66. With this rocking motion, there will be some lifting of the center frame 46 and booms 54 and 56 which is accommodated at the lower end of the center frame 46 by the sliding action of the bracket 78 relative to the bolt 84. The weight acting on the pendulum structure 50 tends to restore the center frame and boom to a position parallel to the frame 14 of the sprayer 10. Since the pendulum action in combination with the guide bolt 84 restores the parallel relation between the sprayer frame 14 and the boom, latch mechanisms which might otherwise be necessary to provide for hillside compensation are obviated.

Having described the preferred embodiment, it will be apparent that modifications can be made without departing from the scope of the invention as defined in the accompanying claims.

We claim:

1. A boom support for a framed vehicle adapted for forward movement over the ground, comprising:
   a support frame connected to the vehicle frame;
   a boom frame; and
   means for supporting the boom frame from the support frame including an upright torsional link having an axis and means connecting one end of the torsional link to the support frame for securing said one end against rotation about the link axis, and means connecting the opposite end of the link to the boom frame, the link yieldingly biasing the boom frame to a normal operating position while accommodating rocking movement of the boom frame from the operating position about the link axis for isolating vehicle yaw from the boom frame.

2. The invention as set forth in claim 1 wherein the means connecting the one end of the torsional link pivotally connects the one end to the support frame for rocking about a fore-and-aft extending axis, and means connecting the boom frame to the opposite end of the link for additionally isolating vehicle roll from the boom frame.

3. The invention as set forth in claim 1 including shock absorbing means connected between the boom and support frames for damping the rocking movement.

4. The invention as set forth in claim 1 wherein the torsional link comprises a single link, and the means connecting the one end and the opposite end of the torsional link comprise: first fore-and-aft extending pivot means connecting the upper end of the link to the support frame and second fore-and-aft extending pivot means connecting the lower end of the link to the boom frame for suspending the boom frame in pendulum fashion from the support frame.

5. The invention as set forth in claim 1 wherein the two means connecting comprise means suspending the boom frame from the support frame for additionally isolating vehicle roll from the boom frame.

6. The invention as set forth in claim 5 wherein the means connecting the one end includes a first pivot connecting the upper end of the torsional link to the support frame and the means connecting the opposite end includes a second pivot connecting the lower end of the torsional link to the boom frame.

7. The invention as set forth in claim 6 including a shock absorber having opposite ends and means connecting said opposite ends respectively to the support frame and the boom frame adjacent the torsional member for damping boom roll.

8. The invention as set forth in claim 6 wherein the first and second pivots define fore-and-aft extending pivotal axes.

9. A boom support for a framed vehicle adapted for forward movement over the ground, comprising:
a support frame connected to the vehicle frame;
a boom frame;
means for supporting the boom frame from the support frame including an upright torsional member and means connecting the torsional member between the boom frame and the support frame for accommodating rocking movement of the boom frame about an upright axis for isolating vehicle yaw from the boom frame;
wherein the torsional member comprises a single link, and the means connecting the torsional member comprises: first fore-and-aft extending pivot means connecting the upper end of the link to the support frame and second fore-and-aft extending pivot means connecting the lower end of the link to the boom frame for suspending the boom frame in pendulum fashion from the support frame; and
wherein the boom frame is substantially rigid and includes upper and lower frame members, said first pivot means being connected to the upper frame member, and further including guide means connected between the lower frame member and the support frame for limiting lateral and fore-and-aft movement of the boom frame relative to the support frame.

* * * * *